No. 658,896. Patented Oct. 2, 1900.
W. H. HIRST.
DRIVING GEAR FOR VELOCIPEDES.
(Application filed June 4, 1900.)

(No Model.) 2 Sheets—Sheet 1.

Witnesses
Louis E. Kippax
Fred H. Rhodes

Inventor
William Henry Hirst

THE NORRIS PETERS CO., PHOTO-LITHO., WASHINGTON, D. C.

No. 658,896. Patented Oct. 2, 1900.
W. H. HIRST.
DRIVING GEAR FOR VELOCIPEDES.
(Application filed June 4, 1900.)
(No Model.) 2 Sheets—Sheet 2.

Witnesses
Louis E. Kippax
Fred H. Rhodes.

Inventor
William Henry Hirst

UNITED STATES PATENT OFFICE.

WILLIAM HENRY HIRST, OF HULL, ENGLAND.

DRIVING-GEAR FOR VELOCIPEDES.

SPECIFICATION forming part of Letters Patent No. 658,896, dated October 2, 1900.

Application filed June 4, 1900. Serial No. 18,967. (No model.)

*To all whom it may concern:*

Be it known that I, WILLIAM HENRY HIRST, a subject of the Queen of Great Britain, residing at Hull, in the county of York, England, have invented certain new and useful Improvements in Driving-Gear for Velocipedes, of which the following is a specification.

The object of this invention is to construct an improved driving-gear for velocipedes by means of which more power can be obtained with less exertion on the part of the rider than is possible with existing gears and driving mechanism. Also a high gear made according to my invention is as easy or easier to drive than a medium gear is with the present construction of chain-wheels and chain. My improved gear may be either chainless or it may have a chain, as desired.

Figure 1:
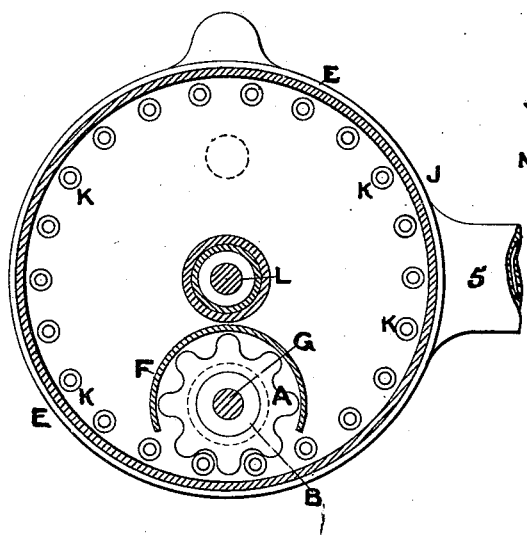
Figure 2:
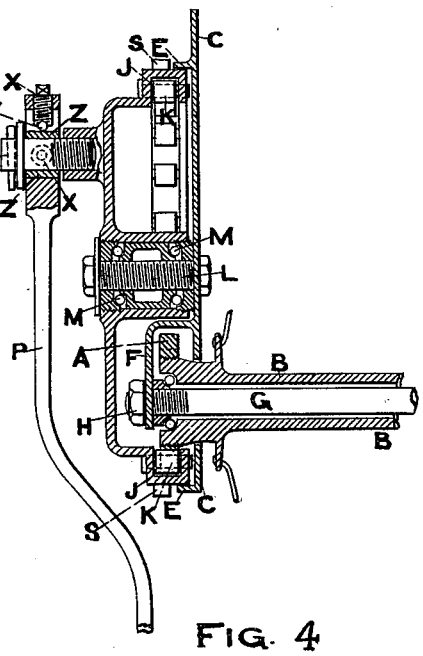
Figure 3:
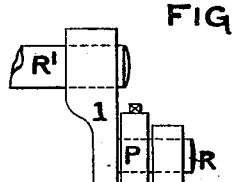
Figure 4:
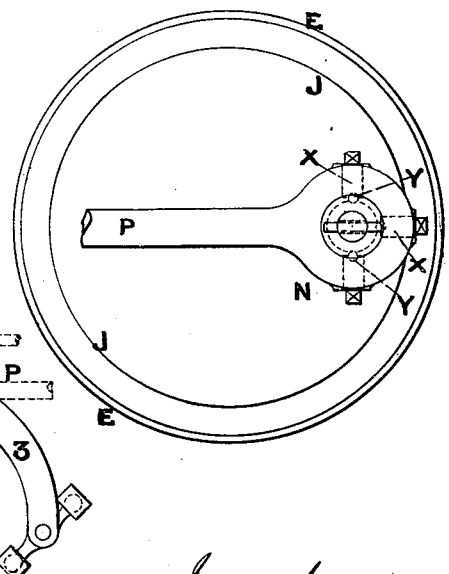
Figure 5:
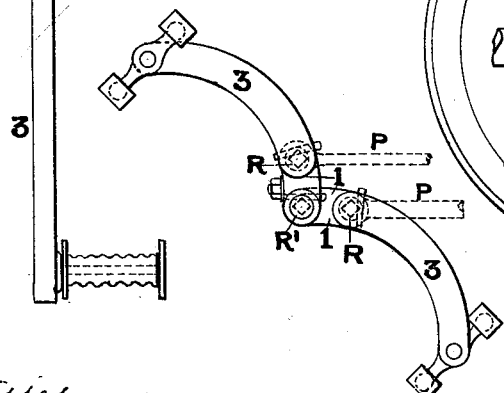
Figure 6:
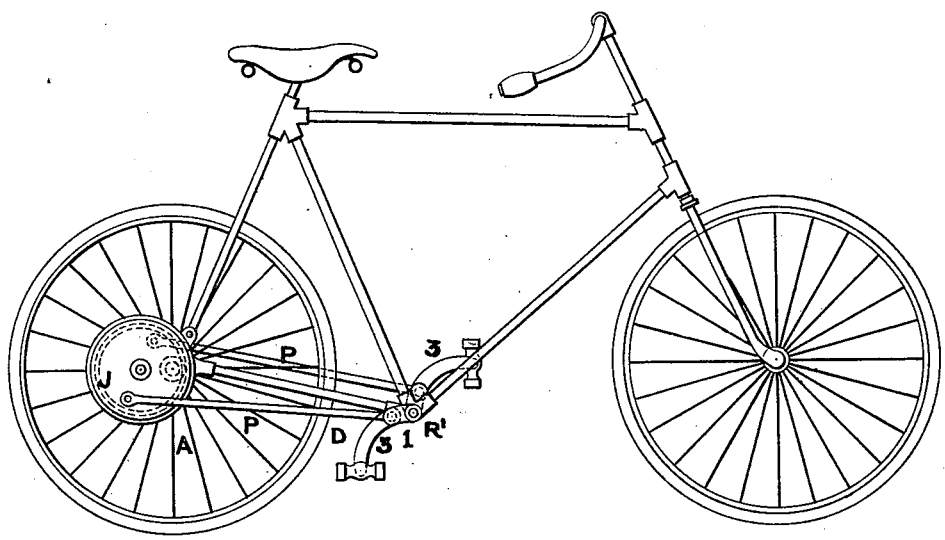
Figure 7:
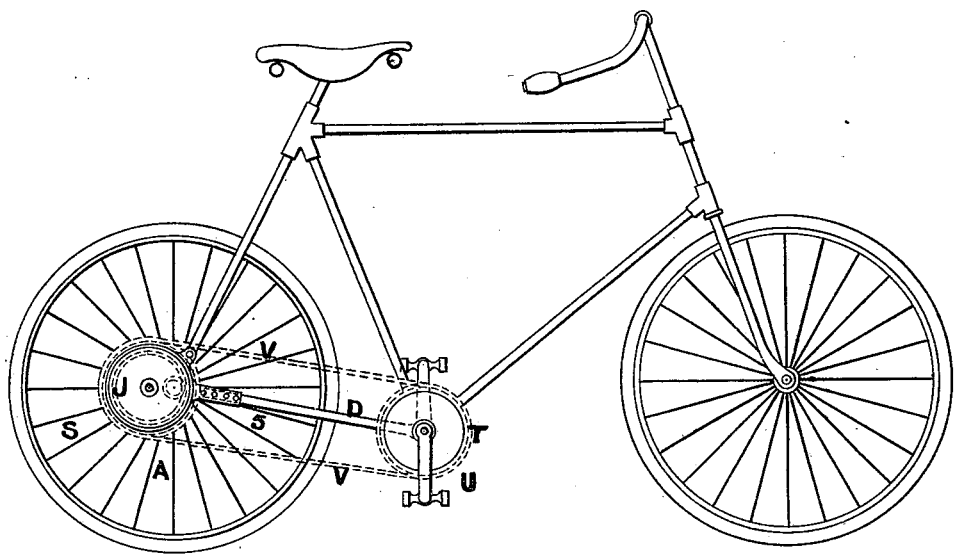

Figure 1 is a sectional side elevation of my improved driving or gear box. Fig. 2 is a sectional plan of my improved driving or gear box mounted upon the hub of a velocipede, showing connecting-rod attached. Fig. 3 is a plan view of pedal-cranks employed when connecting-rods are used in place of chains. Fig. 4 is a side elevation of my improved gear-box, showing connecting-rod attached. Fig. 5 is an elevation of pedal-cranks employed where connecting-rods are used. Fig. 6 is a side elevation of a bicycle, showing my improved driving-gear applied in connection with connecting-rods. Fig. 7 is a side elevation of a bicycle, showing my improved driving or gear box operated by chain.

For the purpose of my invention when my improved driving-gear is used for safety-bicycles I fit a pinion-wheel A on the hub B of the wheel of the cycle, which in rear-driven machines would take the place of the small chain-wheel which has hitherto been fitted in such hub. This pinion is preferably screwed onto the hub. I also employ a circular or other suitably-shaped plate or disk C, which is attached to preferably the back fork D of the cycle. This disk is provided with a projecting ring or flange E, running all the way around it to act as a cover for other parts of the gear and make the same dust-proof and oil-retaining. This plate or disk is provided with a bracket F, which forms a recess or box with an open side for the pinion-wheel A to work within. The end of the axle G of the cycle-wheel passes through this bracket and is secured on the outside by means of a nut H or in any suitable manner. Further, I employ a large hollow wheel J, having internal teeth K, preferably of the kind known as "roller-teeth." This wheel is movably attached to the plate or disk C, which is connected to the rear fork of the cycle, and by being movable it turns on the pin L, which secures it to such plate or disk, ball or other suitable bearings M being employed to prevent friction and to allow of it turning easily.

A stud N, mounted on the wheel J, projects from it, and a connecting-rod P runs from such stud to the treadle crank-pin R, so that by turning the treadle crank-axle R' an eccentric motion is obtained, the internally-toothed wheel turns, and the pinion A runs in gear with the teeth of such wheel, and thus imparts motion to the back wheel of the cycle, so driving the machine.

When the cycle is chainless, I preferably employ two of these gears, one on each side of the wheel or frame, (see Fig. 6,) and two connecting-rods are employed, one to each wheel J and pedal 1; but when a chain is employed for driving purposes the connecting-rods are dispensed with and the internal wheel provided with an additional set of teeth S upon its external periphery, a chain-wheel T (see Fig. 7) is mounted on the treadle crank-axle U in the ordinary way, and a chain V employed for connecting the wheel J with the wheel T on the crank-axle U.

When connecting-rods are used, (see Figs. 2 and 4,) the projection or stud N may be screwed into the outer side of the hollow wheel J and a sleeve Z placed upon it. The connecting-rod is slid onto the sleeve. This rod has holes in it to receive screwed plugs X, having cupped bottoms in which balls Y are placed, such balls bearing on the sleeve Z. By these means the friction on the bearing parts is considerably reduced. Also (see Figs. 3 and 5) where connecting-rods are employed I make the pedal-crank in two pieces—a short piece 1, having a pin R, and a longer piece 3 with a hole through to fit on pin R. The connecting-rod P fits onto the pin in the space between the parts 1 and 3. Further, I find it desirable in this case to bend the pedal-cranks to the segment of a circle, as shown at Fig. 4.

Should it be necessary when chain-driving is employed to tighten or slacken the chain, this operation may be effected by making the back fork D adjustable within the sleeve of the plate or disk C, or any other suitable means may be employed.

By this arrangement of driving-gear besides requiring less power the gear-box is dust-proof and oil-retaining, there is a minimum amount of friction, and in back-pedaling it gives the rider full control of the machine, so requiring no brake.

What I claim as my invention, and desire to secure by Letters Patent, is—

In a velocipede, the combination, with an axle, and a driving-wheel journaled thereon; of a toothed pinion secured to the driving-wheel; a plate secured to the frame of the machine and provided with a projecting stud, an annular flange concentric with the hub, and a projecting bracket which is secured to the said axle and forms a guard for the said pinion; an internal-toothed wheel gearing into the said pinion and running on the said hub and in the said flange and forming a closed chamber with the said plate, and means for revolving the said toothed wheel, substantially as set forth.

In testimony whereof I hereunto affix my signature in the presence of two witnesses.

WILLIAM HENRY HIRST.

Witnesses:
LOUIS E. KIFFAX,
FRED H. RHODES.